United States Patent
Lee et al.

(10) Patent No.: US 9,728,000 B2
(45) Date of Patent: Aug. 8, 2017

(54) APPARATUS AND METHOD OF USING ACCELERATION STRUCTURE IN RAY TRACING

(71) Applicant: Samsung Electronics Co., Ltd., Suwon-si (KR)

(72) Inventors: Jae-don Lee, Yongin-si (KR); Young-sam Shin, Hwaseong-si (KR); Won-jong Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 133 days.

(21) Appl. No.: 14/260,754

(22) Filed: Apr. 24, 2014

(65) Prior Publication Data

US 2015/0109301 A1    Apr. 23, 2015

(30) Foreign Application Priority Data

Oct. 22, 2013 (KR) .................. 10-2013-0126110

(51) Int. Cl.
*G06T 15/06* (2011.01)
*G06T 15/00* (2011.01)
*G06T 17/00* (2006.01)

(52) U.S. Cl.
CPC ............ *G06T 15/06* (2013.01); *G06T 15/005* (2013.01); *G06T 17/005* (2013.01)

(58) Field of Classification Search
CPC .................................................. G06T 15/06
See application file for complete search history.

(56) References Cited

U.S. PATENT DOCUMENTS

| 8,289,324 B1 | 10/2012 | Laine et al. |
| 2003/0163543 A1* | 8/2003 | Deneroff ............ G06F 12/0813 709/214 |
| 2008/0024489 A1* | 1/2008 | Shearer ................. G06T 15/50 345/421 |
| 2008/0088619 A1 | 4/2008 | Shearer et al. |

FOREIGN PATENT DOCUMENTS

KR    10-2013-0002780 A    1/2013

OTHER PUBLICATIONS

Hughes, David M., et al. "Kd-jump: a path-preserving stackless traversal for faster isosurface raytracing on gpus," IEEE Transactions on Visualization and Computer Graphics, vol. 15, No. 6 (2009): 1555-1562.

* cited by examiner

*Primary Examiner* — Daniel Hajnik
(74) *Attorney, Agent, or Firm* — Harness, Dickey & Pierce, P.L.C.

(57) ABSTRACT

An apparatus and a method of using an acceleration structure in ray tracing, and a method of ray tracing are provided. The method involves setting a bit stack value of a level of an acceleration structure, moving to a child node among the ray-crossing child nodes and setting a route value of a corresponding level of the acceleration structure, and determining a pop level based on one or more bit stack values.

18 Claims, 9 Drawing Sheets

APPARATUS AND METHOD OF USING ACCELERATION STRUCTURE IN RAY TRACING

RELATED APPLICATIONS

This application claims the benefit under 35 USC 119(a) of Korean Patent Application No. 10-2013-0126110 filed on Oct. 22, 2013, in the Korean Intellectual Property Office, the entire disclosure of which is incorporated herein by reference for all purposes.

BACKGROUND

1. Field

The following description relates to an apparatus and a method for image rendering with an acceleration structure, and to an apparatus and a method for traversing an acceleration structure in ray tracing to render objects into images with efficiency.

2. Description of Related Art

Creation of a 2-dimensional (2D) image of virtual 3-dimensional (3D) objects may be achieved by various 3D rendering techniques. A 3D rendering technique refers to an image processing technique in which data regarding 3D objects may be synthesized into an image from a given view point.

Many rendering methods involve a rasterization of graphical information to generate an image, in which a 3D object is projected onto a screen or a grid and a ray tracing method is performed to generate the image by tracking the paths of incident lights along rays toward each respective pixels of the screen from a camera view point.

Because it is possible to apply physical properties of light, such as reflection, refraction, transmission, to ray tracing methods, a high quality image may be obtained. However, ray tracing methods require relatively massive calculation. While acceleration structures have been used to render 3D objects into 2D images with improved efficiencies, the computational load imposed by applying a ray tracing method is still significant. Thus, it is difficult to apply a ray tracing method to achieve high-speed rendering of 3D objects.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of using an acceleration structure for ray tracing involves setting a bit stack value of a level of an acceleration structure based on a number of ray-crossing child nodes, moving to a child node among the ray-crossing child nodes and setting a route value of a corresponding level of the acceleration structure, and in response to the child node being a leaf node or a derivative node of the child node not intersecting a ray, determining a pop level based on one or more bit stack values.

The general aspect of the method may further involve determining a number of ray-crossing child nodes before setting the bit stack value, moving from a root node to the pop level based on the route value, moving from the pop level to an untraversed child node among the ray-crossing child nodes based on the route value of the pop level and changing the route value of the pop level, and traversing through the acceleration structure from the untraversed child node.

The bit stack value may indicate whether there is an untraversed child node among the ray-crossing child nodes at the level.

The bit stack value having a first value may indicate that there is no untraversed child node, and the bit stack value having a second value may indicate that there is an untraversed child node among the ray-crossing child nodes.

The setting of the bit stack value may involve, in response to the number of the ray-crossing child nodes being 1, setting the bit stack value of a level corresponding to a parent node thereof to the first value, and, in response to the number of the ray-crossing child nodes being 2 or greater, setting the bit stack value of a level corresponding to a parent node thereof to the second value.

The setting of the route value may involve, in response to moving to a first child node among the ray-crossing child nodes, setting the route value of the level corresponding to a parent node thereof to the first value, and, in response to moving to a second child node among the ray-crossing child nodes, setting the route value of the level corresponding to a parent node thereof to the second value.

The setting of the route value may involve, in response to the number of the ray-crossing child nodes being N, setting the route value by using log N bits.

The determining of the pop level may involve determining a highest level among levels having a bit stack value that corresponds to the second value as the pop level.

The general aspect of the method may further involve, in response to the number of untraversed child nodes among the ray-crossing child nodes being 1, changing the bit stack value of the pop level to the first value.

The moving to the pop level may involve moving from the root node of the acceleration structure to the pop level by moving through child nodes according to the route value of the level.

The changing of the route value of the pop level may involve moving to a child node corresponding to a second route value different from the route value of the pop level, and the route value of the pop level may be changed to a second route value.

In another general aspect, there is provided an acceleration structure traversing apparatus for ray tracing, the apparatus including a calculation unit configured to determine a number of ray-crossing child nodes, a storage unit configured to store bit stack values and route values, the bit stack values for a corresponding level of an acceleration structure being based on the number of ray-crossing child nodes, and the route values for a corresponding level being based on a moving route of an ray, and a control unit configured to determine a pop level based on the bit stack values.

The control unit may be configured to control the ray to move from the root node of the acceleration structure to the pop level based on the route values, to control the ray to move to an untraversed child node among the ray-crossing child nodes at the pop level based on the route value of the pop level, and to change the route value of the pop level, and the calculation unit may be configured to restart traversal from the untraversed child node.

The bit stack value may indicate whether there is an untraversed child node among the ray-crossing child nodes at the level.

In response to the bit stack value having a first value, the control unit may be configured to determine that there is no untraversed child node. In response to the bit stack value having a second value, the control unit may be configured to determine that there is an untraversed child node.

In response to the number of the ray-crossing child nodes being 1, the control unit may be configured to set the bit stack value of a level corresponding to a parent node thereof to the first value. In response to the number of the ray-crossing child nodes being 2 or greater, the control unit may be configured to set the bit stack value of a level corresponding to a parent node thereof to the second value.

In response to moving the ray to a first child node among the ray-crossing child nodes, the control unit may be configured to set the route value of the level corresponding to a parent node thereof to a first value. In response to moving the ray to a second child node among the ray-crossing child nodes, the control unit may be configured to set the route value of the level corresponding to a parent node thereof to a second value.

In response to the number of the ray-crossing child nodes being N, the control unit may be configured to set the route value by using log N bits.

The control unit may be configured to determine a highest level among levels having bit stack values that are the second value as the pop level.

In response to the number of untraversed child nodes among the ray-crossing child nodes being 1, the control unit may be configured to change the bit stack value of the pop level to the first value.

The control unit may be configured to control the ray to move from the root node of the acceleration structure to the pop level by moving through child nodes corresponding to the route value of the level.

In another general aspect, there is provided a computer readable recording medium having recorded thereon a computer program for implementing the general aspect of method described above.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

While 3D rendering techniques may be used to render a high quality image from data regarding virtual 3D objects, the ray tracing method impose a significant computational load. To reduce the computational load, acceleration structures may be used to render images with improved efficiencies. For instances, acceleration structures may be used to spatially divide scene objects, and to store information regarding object features such as primitives.

In 3D rendering techniques using acceleration structures, a large part of calculation in applying the ray tracing method may be involved in the process of traversing through an acceleration structure. An efficient traversal technique may reduce the computational load of rendering images.

Figure 1:
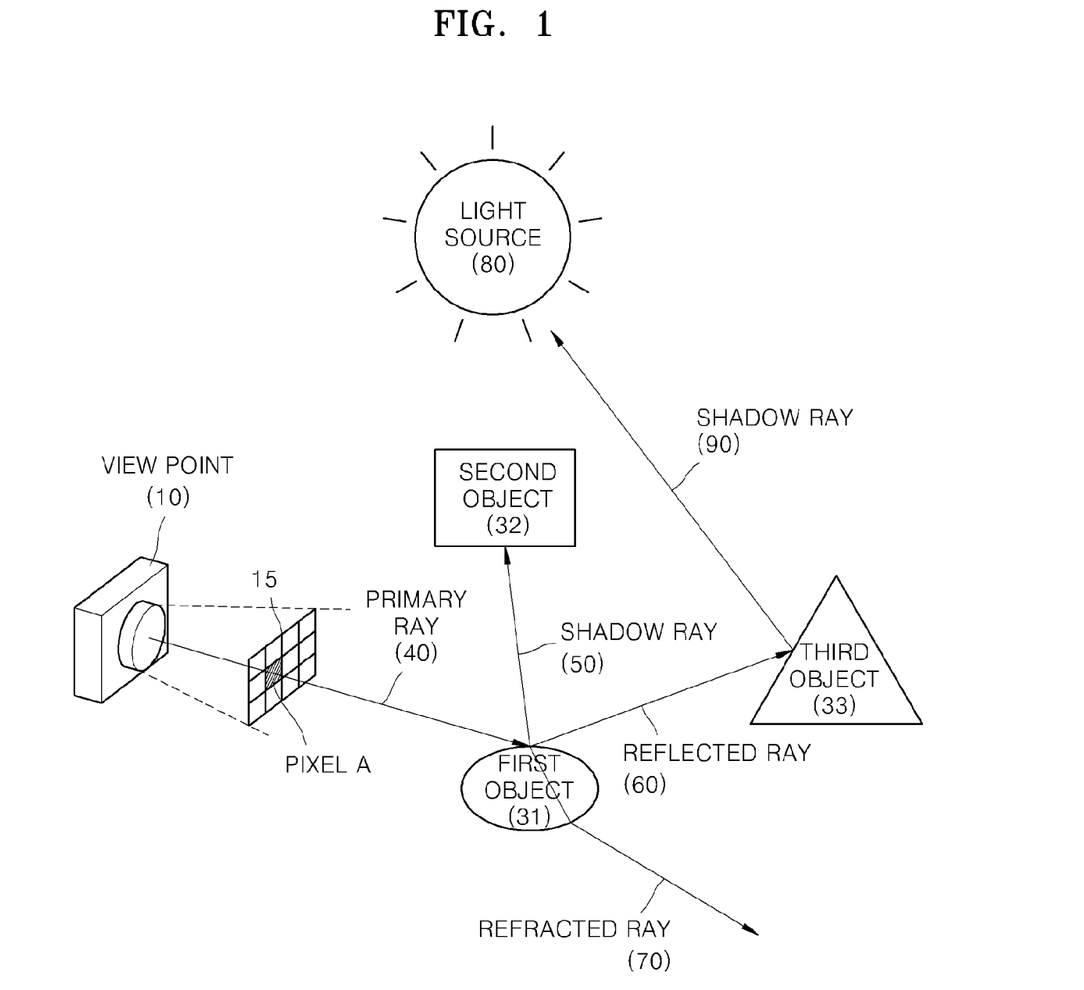
FIG. 1 is a diagram illustrating an example of a ray tracing method.

FIG. 1 is a diagram for describing an example of a ray tracing method.

Referring to FIG. 1, a 3D modeling method may involve obtaining information regarding the location of a light source 80, and the particulars of a first object 31, a second object 32, and a third object 33. While the first object 31, the second object 32, and the third object 33 are represented with 2D objects for convenience of explanation, the first object 31, the second object 32, and the third object 33 are 3D objects with predetermined volume and shape. The 3D geometry of the objects 31, 32, 33 may be stored in a memory storage in the form of data.

To render a realistic image of the 3D objects 31, 32, 33, it must be considered that objects may have various reflective indices and refractive indices. That is, some objects may be transparent or may have shinny surfaces, and some objects may have a surface that reflects lights of certain wavelength while absorbing other wavelengths. In this example, it may be assumed that the first object 31 has reflection index and refraction index that are greater than 0, whereas the second object 32 and the third object 33 may have zero reflection index and zero refraction index. In other words, it may be assumed that the first object 31 reflects and refracts lights, whereas the second object 32 and the third object 33 does neither reflect nor refracts lights, and are opaque.

In the example of the 3D modeling method illustrated in FIG. 1, a rendering apparatus, such as a ray tracing apparatus 100, may determine a view point 10 from which an image of the objects is to be generated, and may determine the grid of a screen image 15 based on the determined view point 10.

With the view point 10 and the grid of the screen image 15 determined, the ray tracing apparatus 100 may generate rays that originate from the view point 10 towards the scene to be rendered through the respective pixels of the screen image 15.

Referring to the example illustrated in FIG. 1, with a screen image 15 having a resolution of 4×3, the ray tracing apparatus 100 may generate rays through each of the 12 pixels.

For illustrative purposes, a ray that penetrates one pixel, for instance pixel A, will be traced.

Referring to FIG. 1, a primary ray 40 is generated from the view point 10 with respect to a pixel A. The primary ray 40 travels through a virtual 3D space and arrives at the first object 31. The first object 31 comprises a group of designated unit regions that are herein referred to as 'primitives.' The primitives may correspond to a polygon such as a triangle, a rectangle, and the like, or to other geometric shapes such as circles, ellipses or other closed 2D shapes. A group of primitives may form surfaces of the first object 31, which may be a 3D object having a volume defined by the surfaces. In this example, it is assumed that the primitive that intersects the primary ray 40 is a circle that forms a surface of the first object 31.

Meanwhile, at a hit point at which the primary ray 40 and the first object 31 meet each other, a shadow ray 50, a reflection ray 60, and a refraction ray 70 may be generated. The shadow ray 50, the reflection ray 60, and the refraction ray 70 are referred to as secondary rays. A ray that is derived from the secondary rays may be referred to as tertiary rays.

The shadow ray 50 is generated at a hit point toward the light source 80. The reflection ray 60 is generated in a direction corresponding to an angle of incidence of the primary ray 40, where a weight based on reflection index of the first object 31 is applied thereto. The refraction ray 70 is generated in a direction corresponding to the angle of incidence of the primary ray 40 and refraction index of the first object 31, where a weight based on the refraction index of the first object 31 is applied thereto The ray tracing apparatus 100 determine whether the hit point is exposed to the light source 80 based on the shadow ray 50. For example, as shown in FIG. 1, when the shadow ray 50 contacts the second object 32, a shadow may be formed at the hit point at which the shadow ray 50 is generated.

Furthermore, the ray tracing apparatus 100 determines whether the refraction ray 70 and the reflection ray 60 arrive at another object. For example, as shown in FIG. 1, no object exists in a path in which the refraction ray 70 travels, whereas the reflection ray 60 arrives at the third object 33. Therefore, the ray tracing apparatus 100 determines information regarding coordinate and color of the hit point of the third object 33 and generates a shadow ray 90 at the hit point of the third object 33 toward the light source 80. Here, the ray tracing apparatus 100 determines whether the shadow ray 90 is exposed to the light source 80.

Meanwhile, since the reflection index and the refraction index of the third object 33 are zero, no reflection ray and no refraction ray are generated with respect to the third object 33.

As described above, the ray tracing apparatus 100 analyzes the primary ray 40 with respect to the pixel A and all rays derived from the primary ray 40 and determines color value regarding the pixel A based on a result of the analysis. The determination of the color value regarding the pixel A is affected by color of the hit point of the primary ray 40, color of the hit point of the reflection ray 60, and whether the shadow ray 50 arrives at the light source 80.

The ray tracing apparatus 100 may generate the screen image 15 by performing the above-stated operations with respect to all of the pixels of the screen image 15.

Figure 2:
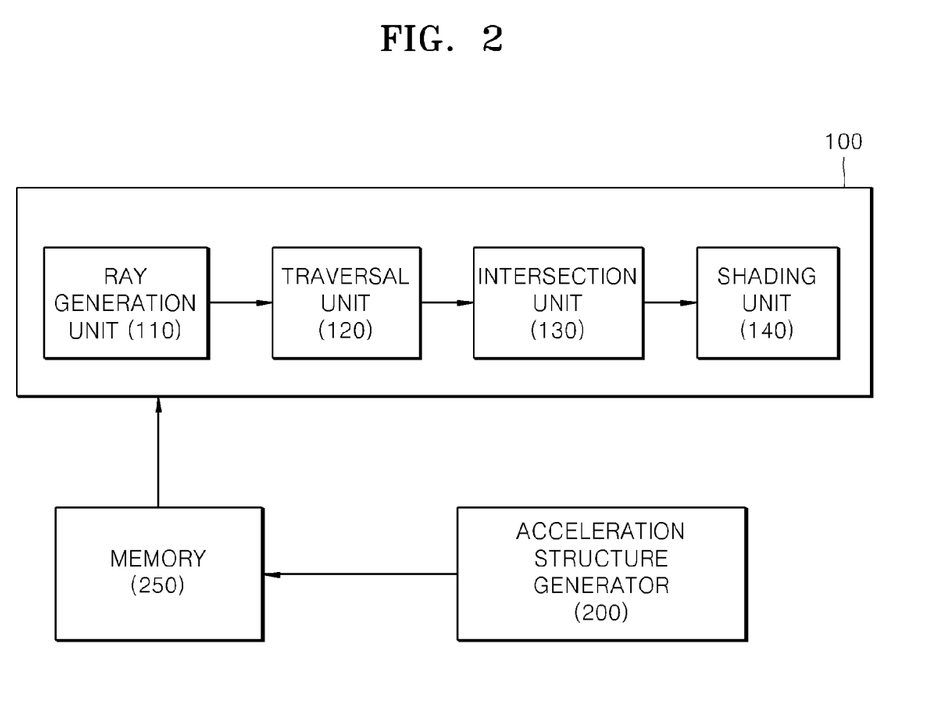
FIG. 2 is a diagram illustrating an example of a ray tracing system.

FIG. 2 is a diagram illustrating an example of a ray tracing system.

Referring to FIG. 2, the ray tracing system may include a ray tracing apparatus 100, a memory 250, and an acceleration structure generator 200. The memory 250 may be an external memory provided outside of the ray tracing apparatus 100, or a memory provided with the ray tracing apparatus 100.

Furthermore, the ray tracing apparatus 100 may include a ray generating unit 110, a traversal unit 120, an intersection unit 130, and a shading unit 140.

The ray generating unit 110 may generate a primary ray and rays derived therefrom. As described above with reference to FIG. 1, the ray generating unit 110 may generate a primary ray at the view point 10 and may generate a secondary ray at a hit point at which the primary ray and a surface of an object intersect each other. The secondary ray may be a reflection ray, a refraction ray, or a shadow ray generated at the hit point at which the primary ray and the object meet each other.

Furthermore, the ray generating unit 110 may generate a 3D ray at a hit point at which the secondary ray and an object intersect each other. The ray generating unit 110 may either continuously generate rays until a ray does not intersect an object or generate rays for a preset number of times.

The traversal unit 120 may receive information regarding generated rays from the ray generating unit 110. The generated rays include a primary ray and rays derived therefrom, including the secondary rays, tertiary rays, and the like.

For example, in case of a primary ray, the traversal unit 120 may receive information regarding a view point and a direction of the generated primary ray. Furthermore, in case of a secondary ray, the traversal unit 120 may receive information regarding a point of origin and a direction of the generated secondary ray. The point of origin of the secondary ray indicates a point at which the primary ray and an object cross each other. Furthermore, a view point or a point of origin may be expressed as coordinates, and a direction may be expressed as a vector.

The traversal unit 120 may obtain information regarding an acceleration structure from the memory 250.

In this example, the acceleration structure is generated by the acceleration structure generator 200, and the generated acceleration structure is stored in the memory 250.

The acceleration structure generator 200 may generate an acceleration structure that includes information regarding positions of objects in a 3D space. The acceleration structure generator 200 may divide the 3D space into a hierarchical tree. The acceleration structure generator 200 may generate various forms of acceleration structure. For example, the acceleration structure generator 200 may generate an acceleration structure that demonstrates relationships between objects in a 3D object by applying a K-dimensional tree (KD-tree) and a bounding volume hierarchy (BVH). Detailed descriptions thereof will be provided below with reference to FIG. 3.

Figure 3:
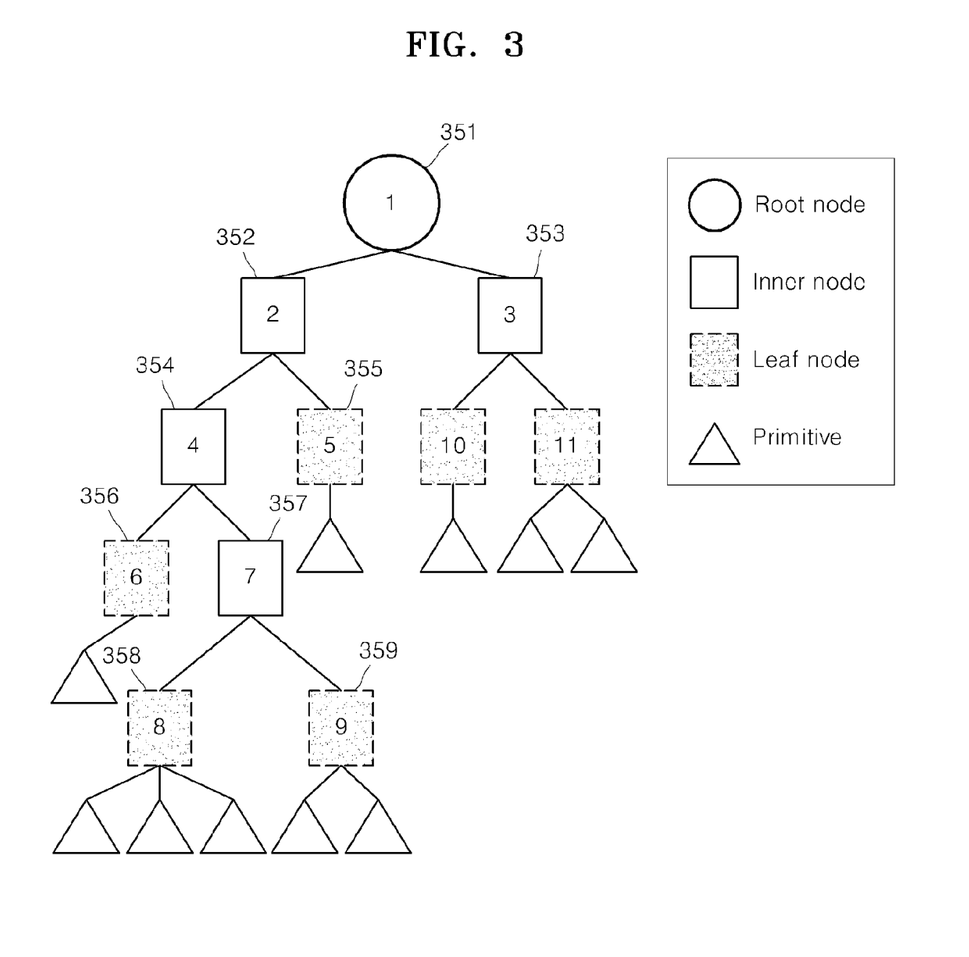
FIG. 3 is a diagram illustrating an example of an acceleration structure used in a ray tracing system.

FIG. 3 is a diagram illustrating an example of an acceleration structure in a ray tracing system.

Hereinafter, for convenience of explanation, nodes will be referred to as numbers indicating the respective nodes in the acceleration structure. For example, a circular node 351 indicated by the number 1 may be referred to as a first node 351, a rectangular node 352 indicated by the number 2 may be referred to as a second node 352, and a dotted rectangular node 355 indicated by the number 5 may be referred to as a fifth node 355.

The acceleration structure may include a root node, an inner node, a leaf node, and a primitive.

In FIG. 3, the first node 351 denotes a root node. The root node is the top node that has no parent node and has only child nodes. For example, child nodes of the first node 351 are the second node 352 and the fifth node 355. No parent node exists for the first node 351.

Furthermore, the second node 352 may be an inner node. An inner node is a node having both a parent node and child nodes. For example, the parent node of the second node 352 is the first node 351, whereas child nodes of the second node 352 are a fourth node 354 and a fifth node 355.

Furthermore, an eighth node 358 may be a leaf node. A leaf node is the bottom node that has only a parent node and has no child node. For example, the parent node of the eighth node 358 is a seventh node 357, and the eighth node 358 does not have any child node.

Meanwhile, a leaf node may include primitives existing on the leaf node. For example, referring to FIG. 3, a sixth node 356 is a leaf node and includes one primitive. The eighth node 358 is a leaf node, and includes three primitives. A ninth node 359 is a leaf node, and includes two primitives.

Referring back to FIG. 2, the traversal unit 120 may traverse the retrieved information regarding the acceleration structure and may detect a ray-crossing leaf node.

The intersection unit 130 may receive a ray-crossing leaf node from the traversal unit 120.

The intersection unit 130 may retrieve information regarding primitives included in the received leaf node from the memory 250.

The intersection unit 130 may perform cross-checks between rays and primitives by using the retrieved information regarding primitives.

For example, the intersection unit 130 may determine which of a plurality of primitives included in a leaf node received from the traversal unit 120 intersects with a ray.

As a result, ray-crossing primitives may be detected, and hit points at which the detected primitives and rays intersect each others may be calculated.

The calculated hit points may be output to the shading unit 140 in the form of coordinates.

The shading unit 140 may determine color value of a pixel based on information regarding the hit points and material properties of the primitive at the hit points. Furthermore, the shading unit 140 may determine color value of a pixel in consideration of basic colors of materials at the hit points and effects based on a light source.

For example, for the pixel A illustrated in FIG. 1, the shading unit 140 may determine a color value of the pixel A in consideration of all of effects based on the primary ray 40 and the refraction ray 70, the reflection ray 60, and the shadow ray 50, which are the secondary rays that extends from the hit point.

Meanwhile, the ray tracing apparatus 100 may receive data for ray tracing from the memory 250. The memory 250 may store an acceleration structure and/or geometry data.

In this example, the acceleration structure is generated by the acceleration structure generator 200 and is stored in the memory 250.

Furthermore, the geometry data refers to information regarding primitives. A primitive may be a polygon, e.g., a triangle, a rectangle, etc., and the geometry data may indicate information regarding vertexes and positions of primitives included in an object. For example, if a primitive is a triangle, the geometry data may include coordinates of three vertexes, normal vectors, or texture coordinates of triangles. The primitives may form, for example, a surface of the object as defined by the geometry data.

Meanwhile, as described above with reference to FIGS. 2 and 3, the ray tracing apparatus 100 may traverse through the acceleration structure and may detect ray-crossing leaf nodes.

The ray tracing apparatus 100 may traverse through an acceleration structure along an arbitrary path and, in response to the traversal being completed along the path, may traverse through the acceleration structure along another path.

In one example, to improve efficiency of the traversal, the ray tracing apparatus 100 may store information regarding untraversed nodes in a stack. In the event that the ray tracing apparatus 100 processes a large number of rays at the same time, there may be limits for using stacks due to limits of storage spaces and bandwidths.

Therefore, in another example, the ray tracing apparatus 100 may either use a stackless algorithm to eliminate stack calculations or use a short track algorithm that replaces stack calculations with a fixed-size buffer.

In such algorithms, when the ray reaches a leaf node during the traversal, the traversal may be restarted from the root to traverse nodes in other untraversed paths.

Therefore, according to an example of the present disclosure, methods of setting bit stack values and route values for respective channels of an acceleration structure without using stacks and efficiently traversing an acceleration structure based on the set values may be used.

Detailed descriptions thereof will be provided below with reference to FIGS. 4 through 9.

Hereinafter, the expression 'moving a ray to a node' does not refer to physical moving of a ray to a node, but rather refers to moving inside an acceleration structure in order to determine whether rays and nodes intersect with each other.

Figure 4:
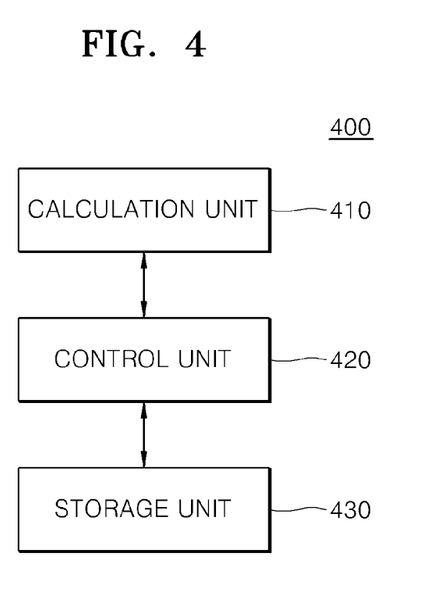
FIG. 4 is a block diagram illustrating an example of an acceleration structure traversing apparatus of a ray tracing system.

FIG. 4 is a block diagram illustrating an example of an acceleration structure traversing apparatus 400 in a ray tracing system.

Referring to FIG. 4, the acceleration structure traversing apparatus 400 may include a calculation unit 410, a control unit 420, and a storage unit 430.

According to one example, the acceleration structure traversing apparatus 400 illustrated in FIG. 4 may correspond to a traversal unit 120 of FIG. 2. Furthermore, the calculation unit 410, the control unit 420, and the storage unit 430 illustrated in FIG. 4 may be for the traversal of an acceleration structure, and may correspond to components included in the traversal unit 120 of FIG. 2. However, the present disclosure is not limited thereto.

The calculation unit 410 may check whether child nodes included in an acceleration structure intersect with rays.

Meanwhile, the storage unit 430 may store bit stack values set with respect to levels of the acceleration structure based on the number of ray-crossing child nodes determined as a result of cross-check. In this example, a bit stack may be a one-bit (1-bit) stack; thus, the bit stack value may be set to a first value or a second value.

Furthermore, if the number of ray-crossing child nodes is 1, the bit stack value may be set to the first value. If the number of ray-crossing child nodes is two or greater, the bit stack value may be set to the second value.

Furthermore, the storage unit 430 may store route values set based on moving route of the ray at correspond levels. Furthermore, if the number of ray-crossing child nodes is N, route value of a level may be set by using log N bits.

The control unit 420 may determine a pop level based on bit stack values set with respect to the respective levels. For example, the highest level among levels corresponding to bit stack value of 2 may be determined as a pop level.

Furthermore, the control unit 420 may control the ray to move from a root node to a determined pop level in the acceleration structure based on the route values set to the respective levels.

Furthermore, in the event that the ray arrived at the pop level, the control unit 420 may control the ray to move to an untraversed child node among ray-crossing child nodes based on the current route value of the pop level and may change the route value of the pop level to a value corresponding to child node to which the ray moved.

Figure 5:
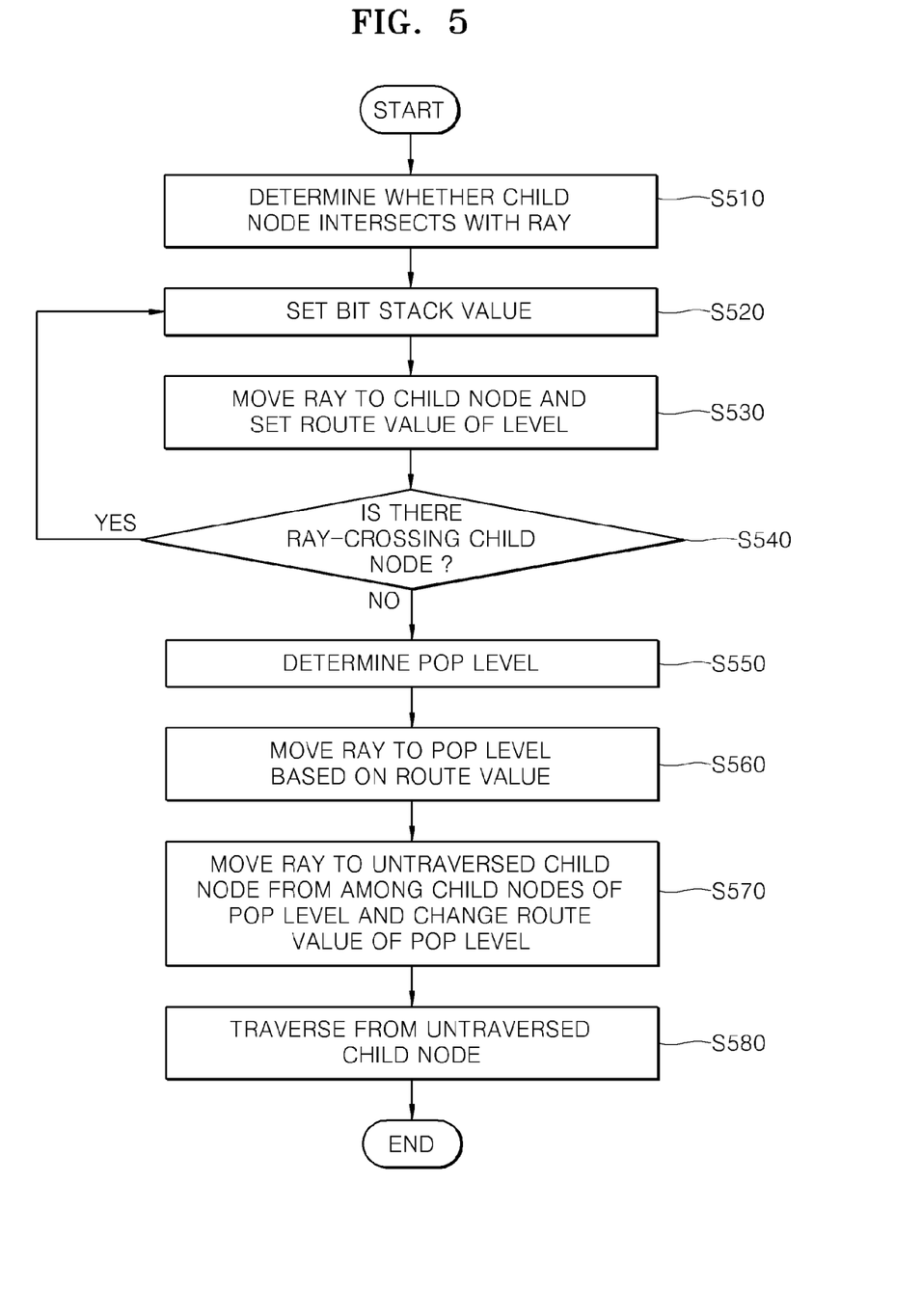
FIG. 5 is a flowchart illustrating an example of a method of traversing an acceleration structure in a ray tracing system.

FIG. 5 is a flowchart illustrating an example of a method of traversing an acceleration structure in a ray tracing system.

The acceleration structure traversing apparatus 400 may traverse an acceleration structure and may determine whether child nodes intersect with rays in S510.

The acceleration structure traversing apparatus 400 may set bit stack values with respect to respective levels of the acceleration structure based on the number of ray-crossing child nodes in S520.

The bit stack may be a one-bit (1-bit) stack, and the bit stack value may be set to a first value or a second value. For example, the first value may be 0 and the second value may be 1, or vice versa.

In this example, for the convenience of explanation, it is assumed that the first value is 0 and the second value is 1.

A bit stack value may indicate whether there is an untraversed child node among ray-crossing child node in a corresponding level. If there is no untraversed child node, the bit stack value may be set to 0. If there is an untraversed child node, the bit stack value may be set to 1.

For example, if the number of ray-crossing child nodes is 1, the acceleration structure traversing apparatus 400 may set a bit stack value of a level corresponding to a parent node to 0, and may control the ray to move to the corresponding child node, and may perform the traversal. On the contrary, if the number of ray-crossing child nodes is 2 or greater, the acceleration structure traversing apparatus 400 may set a bit stack value of a level corresponding to a parent node to 1, may control the ray to move to one node among the ray-crossing child nodes, and then may perform a traversal.

Furthermore, to perform a traversal as described above, the acceleration structure traversing apparatus 400 may control the ray to move to a child node and may set a route value of the level corresponding to the parent level based on the moving route of the ray, as in S530.

A route value of a level is a value indicating the moving route of the ray. In the event that the number of ray-crossing child nodes is N, the acceleration structure traversing apparatus 400 may set a route value of a corresponding level by using log N bits.

For example, if the number of ray-crossing child nodes is 2 and a traversal is performed at the left child node first, the acceleration structure traversing apparatus 400 may set the route value of a level corresponding to a parent node to 0. On the contrary, if a traversal is performed at the right child node first, the acceleration structure traversing apparatus 400 may set the route value of the level corresponding to the parent node to 1.

Furthermore, if the number of ray-crossing child nodes is N and a traversal is performed at the $i^{th}$ child node from the left first, the acceleration structure traversing apparatus 400 may set the route value of a level corresponding to a parent node to i−1.

As described above, the acceleration structure traversing apparatus 400 may continue traversing through an acceleration structure while setting bit stack values and route values with respect to the respective levels of the acceleration structure.

During a traversal of the acceleration structure, a determination is made as to whether any ray-crossing child node exists in S540. In the event that there is no ray-crossing child node, that is, child nodes are leaf nodes or all of child nodes do not cross rays, the acceleration structure traversing apparatus 400 may determine a pop level based on the bit stack values of levels in S550.

Figure 6:
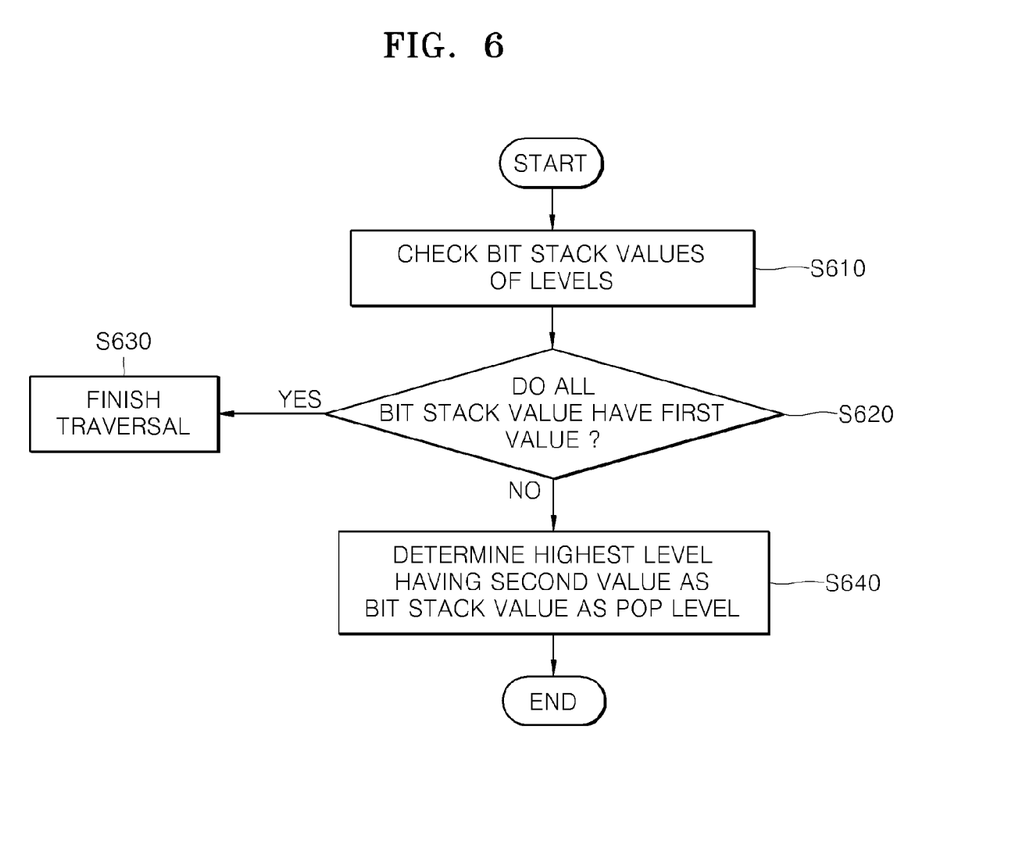
FIG. 6 is a flowchart that further illustrates an operation in the example of the method of traversing acceleration structure illustrated in FIG. 5.

FIG. 6 is a flowchart for further describing the operation S550 of the method illustrated in FIG. 5.

Referring to FIG. 6, the acceleration structure traversing apparatus 400 may check bit stack values of levels in S610.

A determination may be made as to whether all of the bit stack value of the levels are the first value (e.g., 0) in S620. In the event that all of the bit stack value of the levels are the first value, the traversal of the acceleration structure may be terminated in S630.

On the contrary, if not all of the bit stack value of the levels are the first value, the acceleration structure traversing apparatus 400 may determine the highest level among levels having bit stack values that are the second value (e.g., 1) as a pop level in S640.

In the event that the number of untraversed child nodes among ray-crossing child nodes in the pop level is 1, the acceleration structure traversing apparatus 400 may change the bit stack value of the pop level to the first value (e.g., 0).

On the contrary, in the event that the number of untraversed child nodes among ray-crossing child nodes in the pop level is 2 or greater, the acceleration structure traversing apparatus 400 may maintain the bit stack value of the pop level to the second value (e.g., 1).

When the pop level is determined, the acceleration structure traversing apparatus 400 may control the ray to move from the root node to the pop level based on the route values set with respect to the respective levels in S560. Furthermore, when the ray moved to the pop level, the acceleration structure traversing apparatus 400 may control the ray move to an untraversed child node among child nodes at the pop level and change the route value of the pop level in S570.

Figure 7:
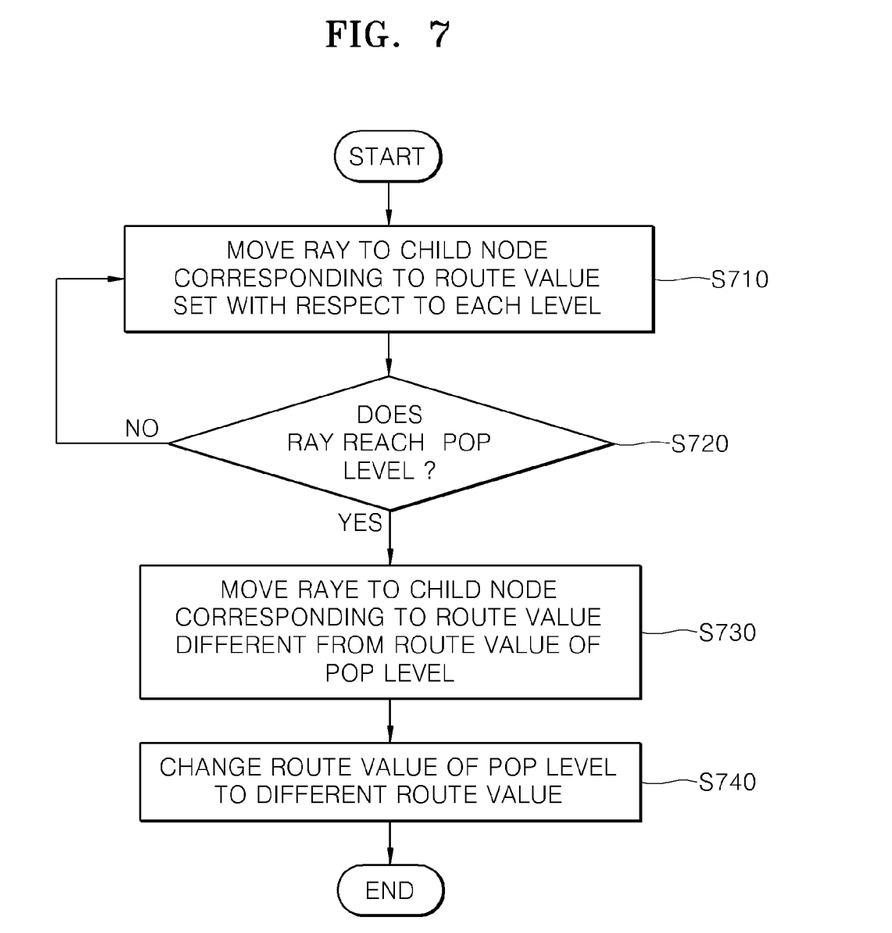
FIG. 7 is a flowchart that further illustrates a number of operations performed according to the method illustrated in FIG. 5.

FIG. 7 is a flowchart for further describing operation S560 and operation S570 of the method illustrated in FIG. 5.

Referring to FIG. 7, the acceleration structure traversing apparatus 400 may control the ray to start from the root node and to move to child nodes corresponding to route values set with respect to the respective levels of an acceleration structure in S710.

For example, in response to a root node including two child nodes and the route value of a level corresponding to the root node is set to the first value (e.g., 0), the acceleration structure traversing apparatus 400 may control the ray to move to the left child node. Alternatively, if a root node includes two child nodes and the route value of a level corresponding to the root node is set to the second value (e.g., 1), the acceleration structure traversing apparatus 400 may control the ray to move to the right child node.

Furthermore, in the event that a root node includes four child nodes, the route value may use 2(log 4) bits and may have four values to correspond to the four child nodes, and thus the acceleration structure traversing apparatus 400 may control the ray to move to child nodes of the root node corresponding to the route value based on the route value of a level including the root node.

For example, if the route value of the level corresponding to the root node is set to the first value (e.g., 0), the acceleration structure traversing apparatus 400 may control the ray to move to the first child node of the root node corresponding to the first value. If the route value of the level corresponding to the root node is set to the second value (e.g., 1), the acceleration structure traversing apparatus 400 may control the ray to move to the second child node of the root node corresponding to the second value.

The acceleration structure traversing apparatus 400 continuously control the ray to move to child nodes corresponding to route value of the respective levels. In response to the ray reaching the pop level, the acceleration structure traversing apparatus 400 may control the ray to move to a child node corresponding to a route value different from the route value of the pop level in S730.

For example, in the event that the route value of the pop level is set to the second value, the acceleration structure traversing apparatus 400 may control the ray to move to a child node corresponding to the route value that is the second value.

Furthermore, the route value of the pop level may be changed to the route value corresponding to the child node to which the ray moved in S740. For example, if the ray moves to a child node corresponding to the route value that is the second value, the route value of the pop level may be changed to the second value.

The acceleration structure traversing apparatus 400 may restart the traversal from the node to which the ray moved in S580.

As described above, the acceleration structure traversing apparatus 400 may continue traversing an acceleration structure until the bit stack values of all levels of the acceleration structure become the first value, as in S630 of FIG. 6.

Figure 8:
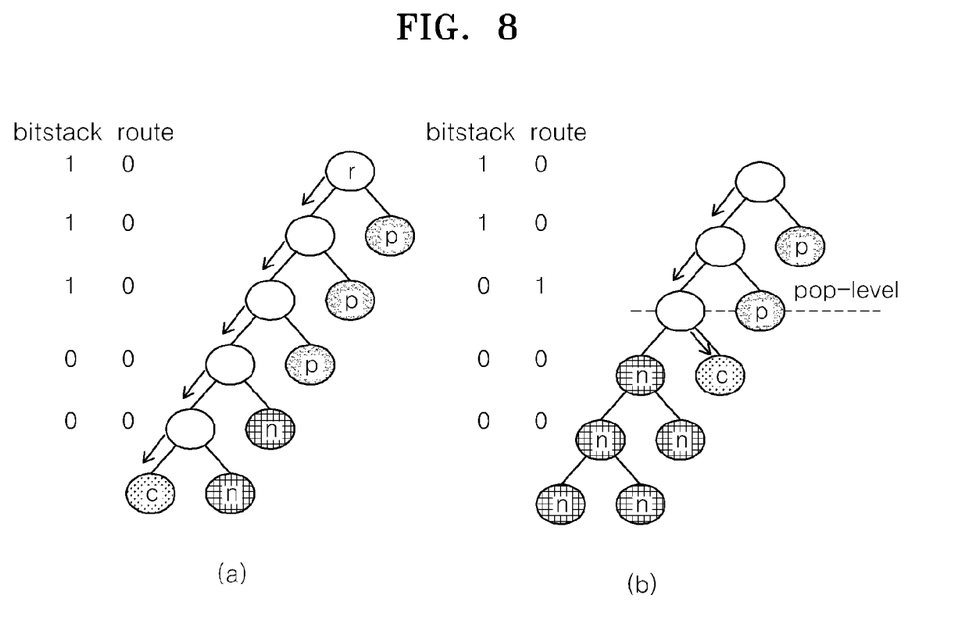
FIG. 8 is a diagram illustrating another example of a method of traversing an acceleration structure in a ray tracing system.

FIG. 8 is a diagram for describing an example of a method of traversing an acceleration structure in a ray tracing system.

Referring to FIG. 8, r denotes a root node, c denotes a node being currently traversed, and p denotes a node to be popped. Furthermore, n denotes a node to not to be traversed for not crossing a ray or being already traversed.

Furthermore, the numbers next to the acceleration structure denote a bit stack value and a route value. For example, in the event that the bit stack value is 0, it indicates that there is no untraversed child node. If the bit stack value is 1, it indicates that there is an untraversed child node.

Referring to FIG. 8(a), because the node c is a leaf node, it is necessary for the acceleration structure traversing apparatus 400 to determine a pop level.

Therefore, the acceleration structure traversing apparatus 400 may check bit stack values of levels included in the acceleration structure, may detect levels of which bit stack values are set to 1, and may determine the highest level among the detected levels as the pop level.

In the example illustrated in FIG. 8(a), the third level, which is the highest level among the levels having the bit stack value of 1, may be determined as the pop level.

As shown in FIG. 8(b), if the number of untraversed child nodes among ray-crossing child nodes at the third level determined as the pop level is 1, the acceleration structure traversing apparatus 400 may change the bit stack value of the pop level to 0.

Referring to FIG. 8(b), when the pop level is determined, the acceleration structure traversing apparatus 400 may control the ray to move from the root node to a child node based on route values set with respect to the respective levels.

For example, if the route value of a level corresponding to a root node is set to 0, the acceleration structure traversing apparatus 400 may control the ray to move from the root node to the left child node. In the event that the route value of a level corresponding to the child node to which the ray moved (second level) is set to 0 again, the acceleration structure traversing apparatus 400 may control the ray to move to the left child node.

Furthermore, although not illustrated, in the event that the route value of a level is set to 1, the acceleration structure traversing apparatus 400 may control the ray to move to the right child node.

When the ray moves as described above and reaches the pop level, the acceleration structure traversing apparatus 400 may control the ray to move to a child node corresponding to a route value different from the currently set route value.

In the example illustrated in FIG. 8(a), in the event that the route value of the pop level is set to 0, the route value of the pop level may be changed to 1, and the acceleration structure traversing apparatus 400 may move to the right child node, which is the child node corresponding to the route value of 1.

Therefore, the acceleration structure traversing apparatus 400 may control the ray to move to a node to be popped and may perform a traversal.

Figure 9:
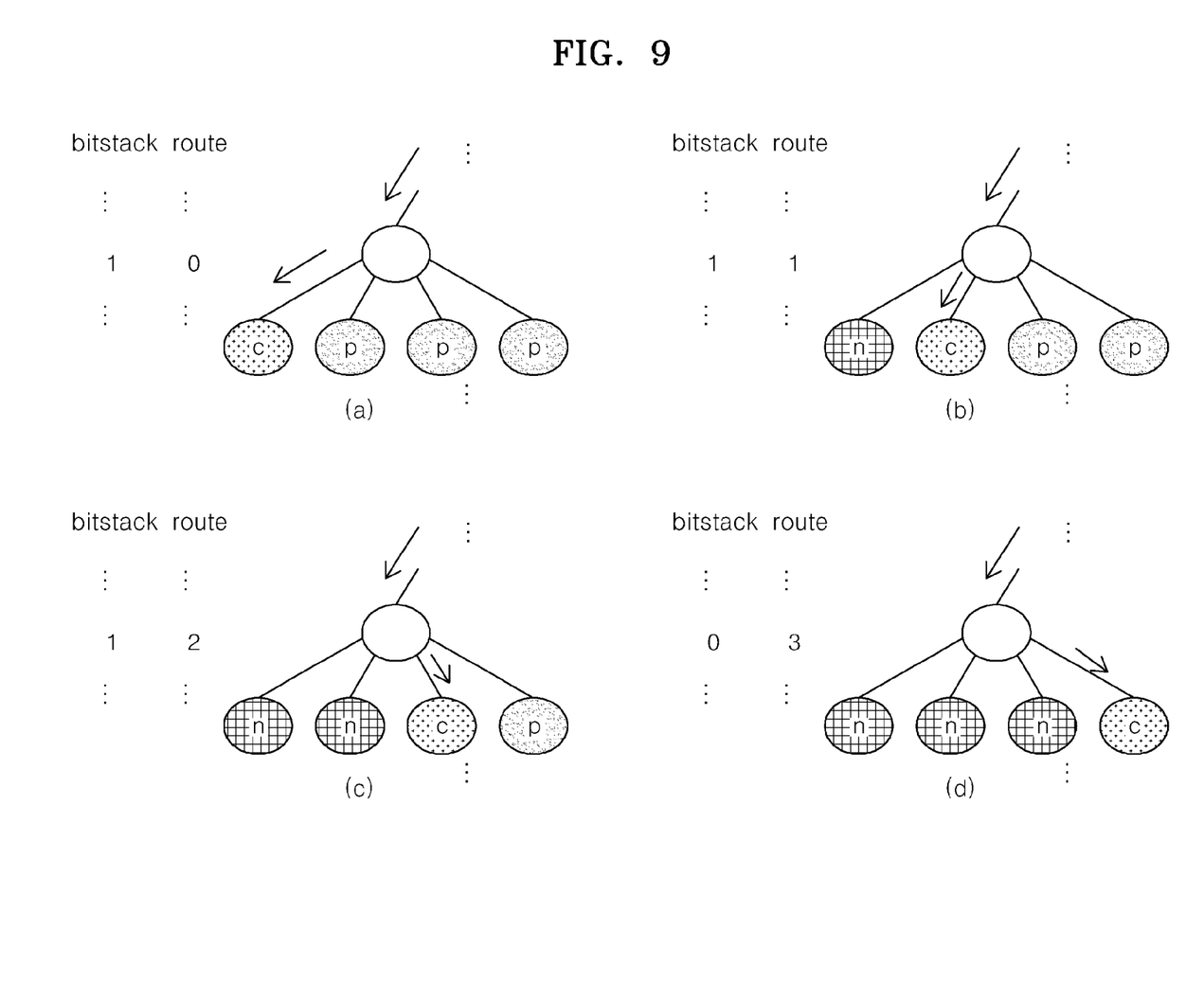
FIG. 9 is a diagram illustrating an example of a method of setting bit stack values and route values in a ray tracing system.

FIG. 9 is a diagram for describing an example of a method of setting bit stack values and route values in a ray tracing system.

Referring to FIG. 9, c denotes a node being currently traversed, and p denotes a node to be popped. Furthermore, n denotes a node that is already traversed and will not be traversed.

Furthermore, the numbers next to the acceleration structure denote a bit stack value and a route value. If the bit stack value is 0, it indicates that there is no untraversed child node. If the bit stack value is 1, it indicates that there is an untraversed child node.

Meanwhile, in the event that the number of child nodes of a node at a current level is N, route value of a level may be set by using log N bits.

For example, in the event that a node at a current level has 4 child nodes, the route value of the current level may be set by using 2 bits (or log 4 bits).

Furthermore, if the ray moves to the $i^{th}$ child node from the left among N child nodes, the route value may be set to i−1.

Referring to FIG. 9(a), in the event that the ray moves to the first child node from the left among the 4 child nodes, the route value may be set to 0. Because there are child nodes to be traversed at the current level, the bit stack value may be set to 1.

Referring to FIG. 9(b), in the event that the ray moves to the second child node after the traversal of the first child node from the left among the 4 child nodes, the route value of the current level may be set to 1. In this example, because there are child nodes to be traversed at a current level, the bit stack value may be maintained to 1.

Referring to FIG. 9(c), in the event that the ray moves to the third child node after the traversals of the first child node and the second child node, the route value of the current level may be set to 2. In this example, because there are child nodes to be traversed at a current level, the bit stack value may be maintained to 1.

Referring to FIG. 9(d), if the acceleration structure ray moves to the fourth child node after the traversals of the first child node, the second child node, and the third child node, the route value of the current level may be set to 3. Because there is no additional child node to be traversed at a current level, the bit stack value may be changed to 0.

Meanwhile, Table 1 below illustrates an example of computer readable codes that may be used to implement a method of traversing an acceleration structure.

TABLE 1

| | CAST-RAY(ray) | | POP( ) |
|---|---|---|---|
| 1 | node ← ROOT | 1 | if bitstack = 0 then terminate transversal |
| 2 | bitstack ← (0,0,...) | 2 | popLevel ← largest i where bitstack[i] = 1 |
| 3 | route ← (0,0,...) | 3 | bitstack[poplevel] ← 0 |
| 4 | level ← 1 | 4 | level ← 1 |
| 5 | while true | 5 | if short stack is exhausted then |
| 6 |   while node is not leaf do | 6 |   node ← ROOT |
| 7 |     intersect ray against children of node | 7 |   while (level < popLevel) do |
| 8 |     if left child was intersected then | 8 |     if (route[level] = 0) then |
| 9 |       node ← left child | 9 |       node ← left child |
| 10 |       route[level] ← 0 | 10 |     else |
| 11 |       if right child was intersected then | 11 |       node ← right child |
| 12 |         bitstack[level] ← 1 | 12 |     end if |
| 13 |         PUSH(right child) | 13 |     level ← level + 1 |
| 14 |       end if | 14 |   end while |
| 15 |       level ← level + 1 | 15 |   node ← right child |
| 16 |     else if right child was intersected then | 16 |   route[level] ← 1 |
| 17 |       node ← right child | 17 |   level ← level + 1 |
| 18 |       route[level] ← 1 | 18 | else |
| 19 |       level ← level + 1 | 19 |   node ← pop short stack |
| 20 |     else | 20 |   level ← level + popLevel |
| 21 |       POP( ) | 10 | end if |
| 22 |     end if | | |
| 23 |   end while | | |
| 24 |   intersect ray against primitives in node | | |
| 25 |   POP( ) | | |
| 26 | end while | | |

With this example of a method of traversing through an acceleration structure, the acceleration structure may be efficiently traversed without using stacks. Accordingly, the amount of memory used for traversing through an acceleration structure may be reduced. Further, as a result, the processing capacity and the processing speed of a ray tracing system may be improved.

This example and other examples described in the present disclosure may be also implemented through a computer readable code, computer instructions and the like, and such computer readable code or instructions may be recorded on a medium, such as a non-transitory computer readable medium, to control at least one processing element of a computer or a computing system. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of using an acceleration structure for ray tracing, the method comprising:
   setting a bit stack value of a level of an acceleration structure based on a number of ray-crossing child nodes;
   moving to a child node among the ray-crossing child nodes and setting a route value of a corresponding level of the acceleration structure; and
   in response to the child node being a leaf node or a derivative node of the child node not intersecting a ray, determining a pop level based on relative level among levels having one or more bit stack values,
   wherein the bit stack value indicates whether there is an untraversed child node among the ray-crossing child nodes at the level, the bit stack value has a first value that indicates there is no untraversed child node and a second value that indicates that there is an untraversed child node among the ray-crossing child nodes,
   wherein the determining of the pop level comprises determining a highest level among levels having a bit stack value that corresponds to the second value as the pop level.

2. The method of claim 1, further comprising:
   determining the number of ray-crossing child nodes before setting the bit stack value;
   moving from a root node to the pop level based on the route value;
   moving from the pop level to an untraversed child node among the ray-crossing child nodes based on the route value of the pop level and changing the route value of the pop level; and
   traversing through the acceleration structure from the untraversed child node.

3. The method of claim 2, wherein the setting of the bit stack value comprises, in response to the number of the ray-crossing child nodes being 1, setting the bit stack value of a level corresponding to a parent node thereof to a first value, and
   in response to the number of the ray-crossing child nodes being 2 or greater, setting the bit stack value of a level corresponding to a parent node thereof to a second value.

4. The method of claim 2, wherein the setting of the route value comprises, in response to moving to a first child node among the ray-crossing child nodes, setting the route value of the level corresponding to a parent node thereof to a first value, and,
   in response to moving to a second child node among the ray-crossing child nodes, setting the route value of the level corresponding to a parent node thereof to a second value.

5. The method of claim 2, wherein the setting of the route value comprises, in response to the number of the ray-crossing child nodes being N, setting the route value by using log N bits.

6. The method of claim 2, wherein the moving to the pop level comprises moving from the root node of the acceleration structure to the pop level by moving through child nodes according to the route value of the level.

7. The method of claim 2, wherein the changing of the route value of the pop level comprises moving to a child node corresponding to a second route value different from the route value of the pop level, and the route value of the pop level being changed to a second route value.

8. The method of claim 1, wherein the bit stack value is set in a one-bit stack.

9. The method of claim 1, further comprising, in response to the number of untraversed child nodes among the ray-crossing child nodes being 1, changing the bit stack value of the pop level to the first value.

10. A non-transitory computer readable recording medium having recorded thereon a computer readable code to control at least one processing device to implement the method of claim 1.

11. An acceleration structure traversing apparatus for ray tracing, the apparatus comprising:
    a calculation unit configured to determine a number of ray-crossing child nodes;
    a storage unit configured to store bit stack values and route values, the bit stack values for a corresponding level of an acceleration structure being based on the number of ray-crossing child nodes, and the route values for a corresponding level being based on a moving route of a ray; and
    a control unit configured to determine a pop level based on relative level among levels having the bit stack values,
    wherein the calculation unit, the storage unit and the control unit are implemented by one or more processors, and
    wherein the bit stack value indicates whether there is an untraversed child node among the ray-crossing child nodes at the level, the bit stack value has a first value that indicates there is no untraversed child node and a second value that indicates that there is an untraversed child node among the ray-crossing child nodes,
    wherein the control unit is configured to determine a highest level among levels having a bit stack value that corresponds to the second value as the pop level.

12. The apparatus of claim 11, wherein the control unit is configured to control the ray to move from the root node of the acceleration structure to the pop level based on the route values, to control the ray to move to an untraversed child node among the ray-crossing child nodes at the pop level based on the route value of the pop level, and to change the route value of the pop level, and
    wherein the calculation unit is configured to restart traversal from the untraversed child node.

13. The apparatus of claim 12, wherein, in response to moving the ray to a first child node among the ray-crossing child nodes, the control unit is configured to set the route value of the level corresponding to a parent node thereof to a first value, and,
    in response to moving the ray to a second child node among the ray-crossing child nodes, the control unit is configured to set the route value of the level corresponding to a parent node thereof to a second value.

14. The apparatus of claim 12, wherein, in response to the number of the ray-crossing child nodes being N, the control unit is configured to set the route value by using log N bits.

15. The apparatus of claim 12, wherein the control unit is configured to control the ray to move from the root node of the acceleration structure to the pop level by moving through child nodes corresponding to the route value of the level.

16. The apparatus of claim 11, wherein the bit stack value is stored in a one-bit stack.

17. The apparatus of claim 11, wherein, in response to the number of the ray-crossing child nodes being 1, the control unit is configured to set the bit stack value of a level corresponding to a parent node thereof to the first value, and in response to the number of the ray-crossing child nodes being 2 or greater, the control unit is configured to set the bit stack value of a level corresponding to a parent node thereof to the second value.

18. The apparatus of claim 11, wherein, in response to the number of untraversed child nodes among the ray-crossing child nodes being 1, the control unit is configured to change the bit stack value of the pop level to the first value.

* * * * *